(12) United States Patent
Heverly et al.

(10) Patent No.: US 11,173,521 B2
(45) Date of Patent: Nov. 16, 2021

(54) VIBRATION ATTENUATOR

(71) Applicant: Bell Helicopter Textron Inc., Fort Worth, TX (US)

(72) Inventors: David Heverly, Arlington, TX (US); Frank Bradley Stamps, Colleyville, TX (US); Gary Miller, North Richland Hills, TX (US); Richard E. Rauber, Euless, TX (US); Thomas C. Parham, Jr., Colleyville, TX (US); Michael R. Smith, Colleyville, TX (US); Michael Scott Seifert, Southlake, TX (US); Jouyoung Jason Choi, Southlake, TX (US)

(73) Assignee: Textron Innovations Inc., Providence, RI (US)

(*) Notice: Subject to any disclaimer, the term of this patent is extended or adjusted under 35 U.S.C. 154(b) by 176 days.

(21) Appl. No.: 16/284,931

(22) Filed: Feb. 25, 2019

(65) Prior Publication Data

US 2019/0263512 A1 Aug. 29, 2019

Related U.S. Application Data

(60) Provisional application No. 62/634,896, filed on Feb. 25, 2018.

(51) Int. Cl.
| | |
|---|---|
| *B64C 27/00* | (2006.01) |
| *B06B 1/16* | (2006.01) |
| *F16F 15/22* | (2006.01) |
| *F16F 7/116* | (2006.01) |
| *F16F 15/06* | (2006.01) |

(52) U.S. Cl.
CPC .............. *B06B 1/164* (2013.01); *F16F 7/116* (2013.01); *F16F 15/06* (2013.01); *F16F 15/22* (2013.01); *B64C 27/001* (2013.01); *B64C 2027/003* (2013.01); *B64C 2027/005* (2013.01)

(58) Field of Classification Search
CPC . B06B 1/164; F16F 7/116; F16F 15/06; F16F 15/22; B64C 27/001; B64C 2027/003; B64C 2027/005
See application file for complete search history.

(56) References Cited

U.S. PATENT DOCUMENTS

| | | | |
|---|---|---|---|
| 8,764,398 B2 * | 7/2014 | Girard | F16F 7/116 416/134 A |
| 2017/0259911 A1 * | 9/2017 | Choi | B64C 29/0033 |

* cited by examiner

*Primary Examiner* — Richard A Edgar
(74) *Attorney, Agent, or Firm* — Lightfoot & Alford PLLC

(57) ABSTRACT

A vibration attenuator for a rotor is rotatable about a mast axis and has a frame configured for rotation about the mast axis relative to the rotor. A first mass is axially translatable in a first direction relative to the frame parallel to a first axis, and a first biasing force urges the first mass toward a first-mass rest position in which the first mass is symmetric about the mast axis. A second mass is axially translatable in a second direction relative to the frame parallel to a second axis, and a second biasing force urges the second mass toward a second-mass rest position in which the second mass is symmetric about the mast axis. A selected first or second mass moves radially outward from the rest position to oppose vibrations in the rotor.

16 Claims, 13 Drawing Sheets

VIBRATION ATTENUATOR

CROSS-REFERENCE TO RELATED APPLICATIONS

This application claims the benefit of the filing date of U.S. Provisional Patent Application Ser. No. 62/634,896, filed on 25 Feb. 2018 and titled "VIBRATION ATTENUATOR," the content of which is incorporated by reference.

STATEMENT REGARDING FEDERALLY SPONSORED RESEARCH OR DEVELOPMENT

Not applicable.

BACKGROUND

Rotary-wing aircraft, such as helicopters and tiltrotors, have at least one rotor for providing lift and propulsion forces, and these rotors have at least two airfoil blades connected to a rotatable hub. The rotor blades cause vibrations that are a function of the rotational speed of the rotor, and aircraft designers have difficulty accurately predicting the exact vibration modes that a rotor configuration will encounter. The vibrations can be transmitted through the rotor mast, through associated powertrain components, and into the airframe of the aircraft, and these vibrations can reduce the life of affected components and cause undesirable vibrations for passengers. Various types of vibration attenuation systems have been developed to reduce or eliminate these vibrations. The conventional systems include airframe-mounted vibration attenuators and mast-mounted systems.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The vibration attenuator disclosed herein is a hub- or mast-mounted vibration-reduction device for rotorcraft, the device comprising at least one mass assembly biased toward a rest position, in which the mass of the mass assembly (including biasing device) is preferably symmetric about a mast axis. The disclosed system has a base frame that is attached to a rotor-hub assembly or rotor mast and configured for rotation relative to the rotor. The center of mass of the mass assembly moves in a circular path that varies in radius proportionally with the N/REV vibration magnitude and is phased 180 degrees from the N/REV vibration for counteracting the hub vibration.

The embodiments of this attenuator are especially useful for tiltrotors that operate at one rotor RPM (revolutions per minute) for helicopter mode and another rotor RPM for airplane mode. The attenuator may be tuned by altering the mass of a mass assembly, altering the spring rate of a device biasing a mass assembly toward the rest position, and/or by altering the distance each mass assembly can translate. At least one embodiment has two mass assemblies with different spring rates, which are optimal for two different rotor RPM values, though it should be noted that each embodiment may also operate between the target RPM values and may phase as RPM changes. Typically, a softer spring is used for the lower RPM, and a stiffer spring will be used for the higher RPM.

Figure 1:
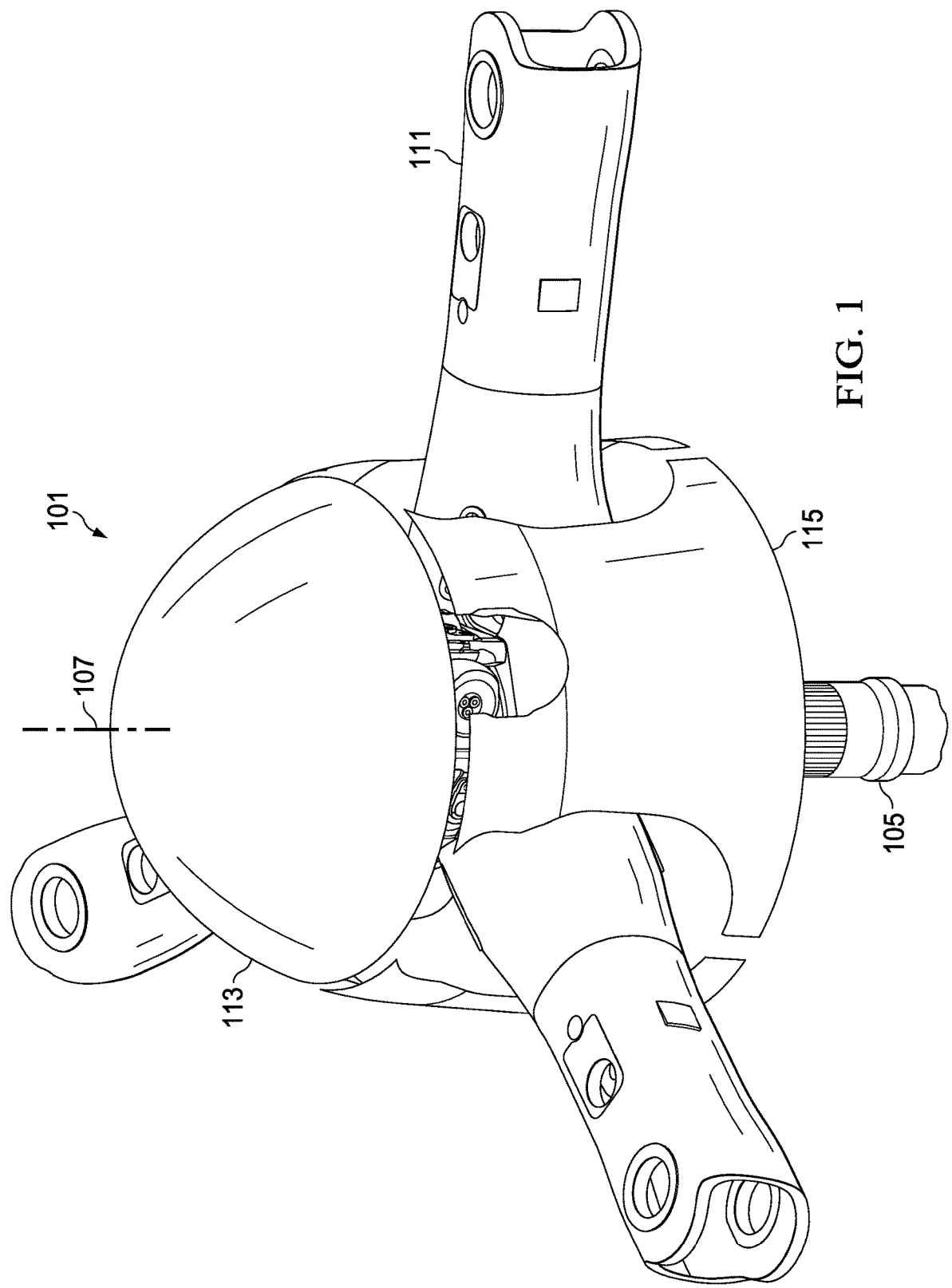
FIG. 1 is an oblique view of a rotor for an aircraft, the rotor comprising an embodiment of a vibration attenuator according to this disclosure.
Figure 2:
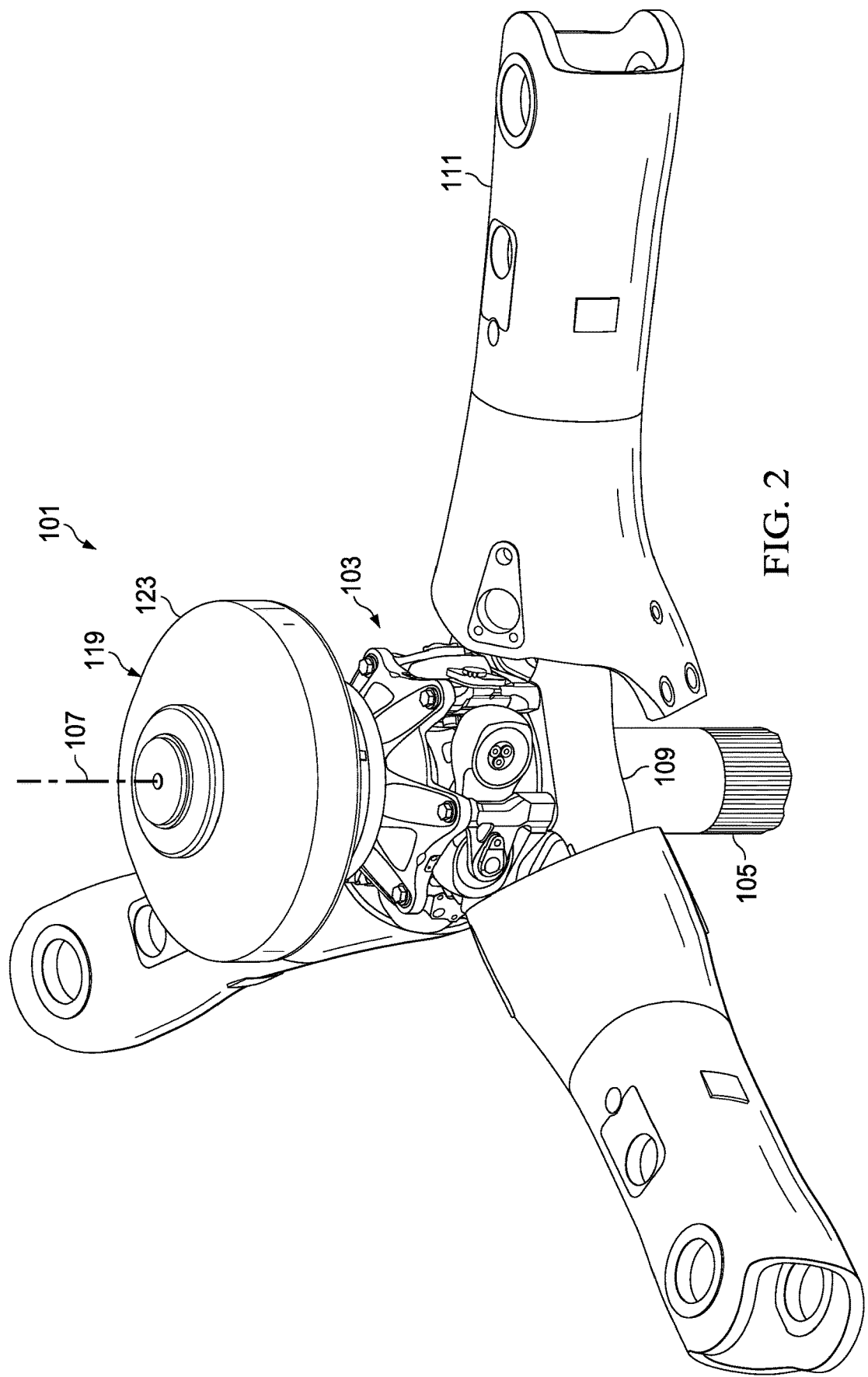
FIG. 2 is an oblique view of the rotor of FIG. 1 with components removed.

Referring now to FIGS. 1 and 2, a rotor 101 for an aircraft comprises a hub assembly 103 coupled to a mast 105 for rotation therewith about a mast axis 107. Hub assembly 103 comprises a yoke 109, and blade grips 111 couple rotor blades (not shown) to yoke 109 for causing rotation of the blades together with hub assembly 103 about mast axis 107. In the embodiment shown, hub assembly 103 allows yoke 109 and the attached blades to gimbal relative to mast 105. Removable covers 113, 115 shroud hub assembly 103.

Figure 3:
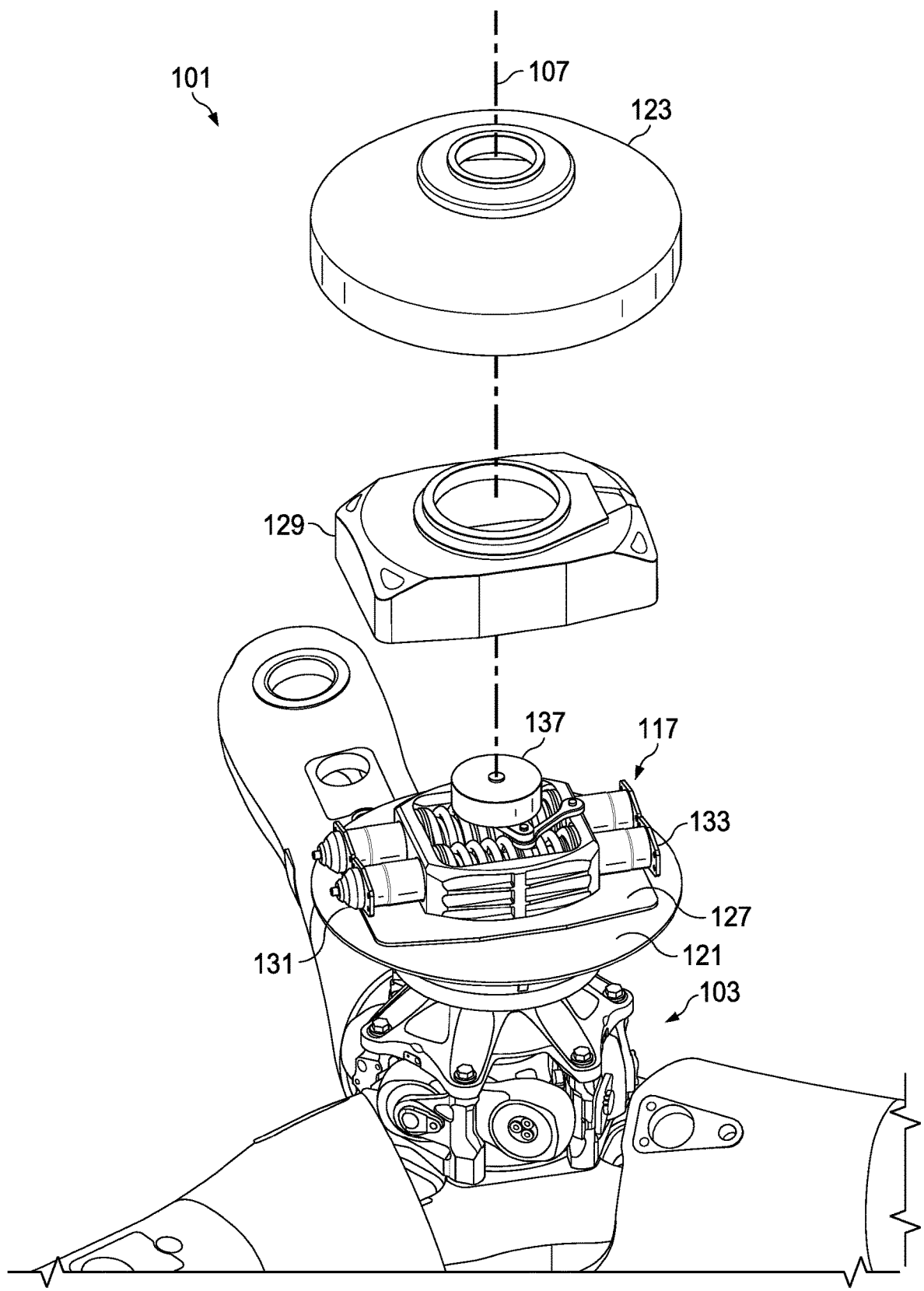
FIG. 3 is a partially exploded oblique view of the rotor of FIG. 1.
Figure 4:
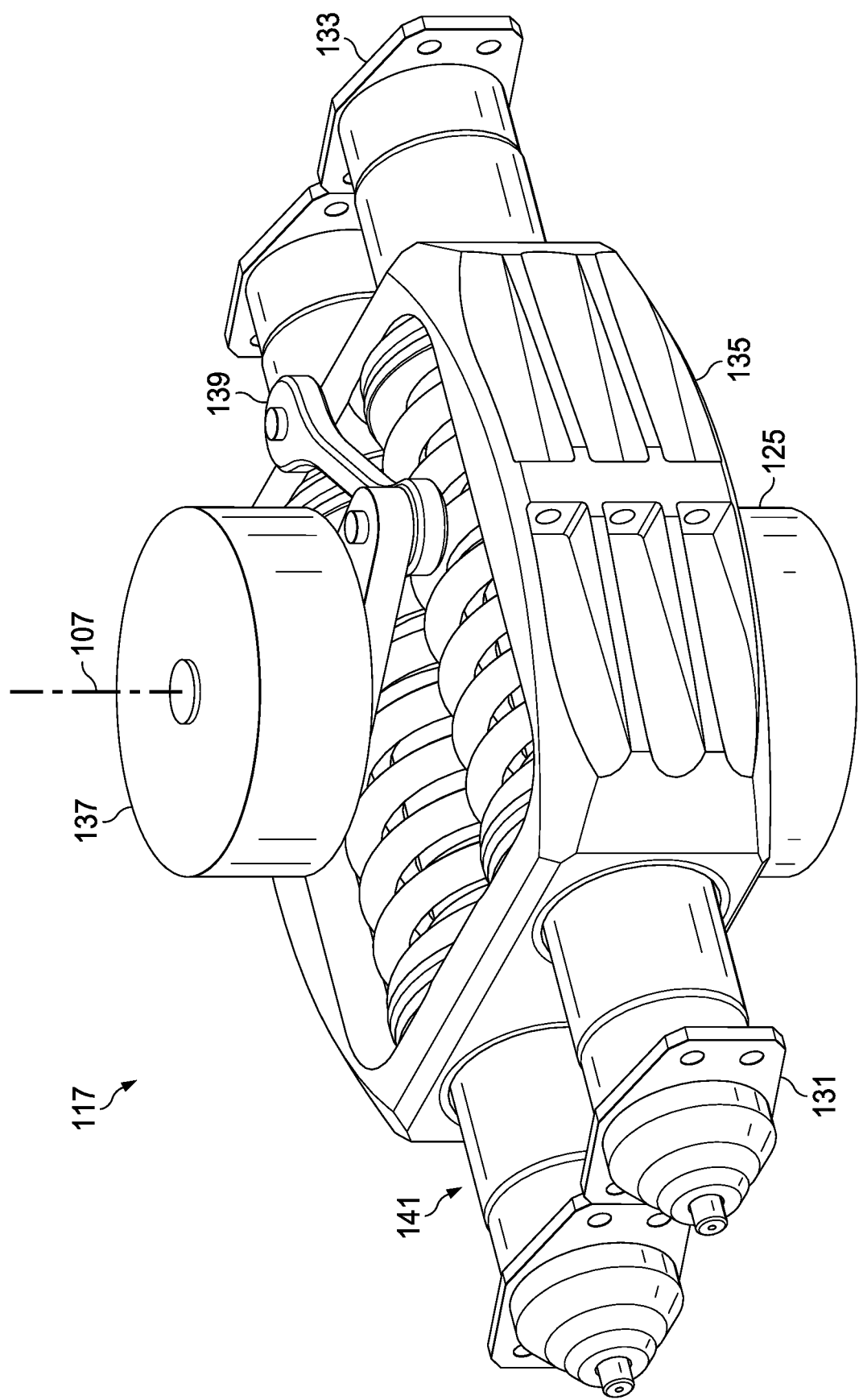
FIG. 4 is an oblique view of the vibration attenuator of the rotor of FIG. 1.

Referring now to FIGS. 2 through 4, rotor 101 comprises a vibration attenuator 117 rotatably carried within housing 119. Housing 119 comprises a base plate 121 and a cover 123, and housing 119 is coupled to, and rotates with, mast 105, though attenuator 117 may alternatively be mounted to hub assembly 103 and gimbal with hub assembly 103 relative to mast 105. An electric motor 125 rotates attenuator 117 within housing 119 relative to mast 105 and hub assembly 103. Attenuator 117 has a housing comprising base plate 127 and cover 129, and flanges 131, 133 are attached to base plate 127 or cover 129 for mounting attenuator 117.

Figure 5:
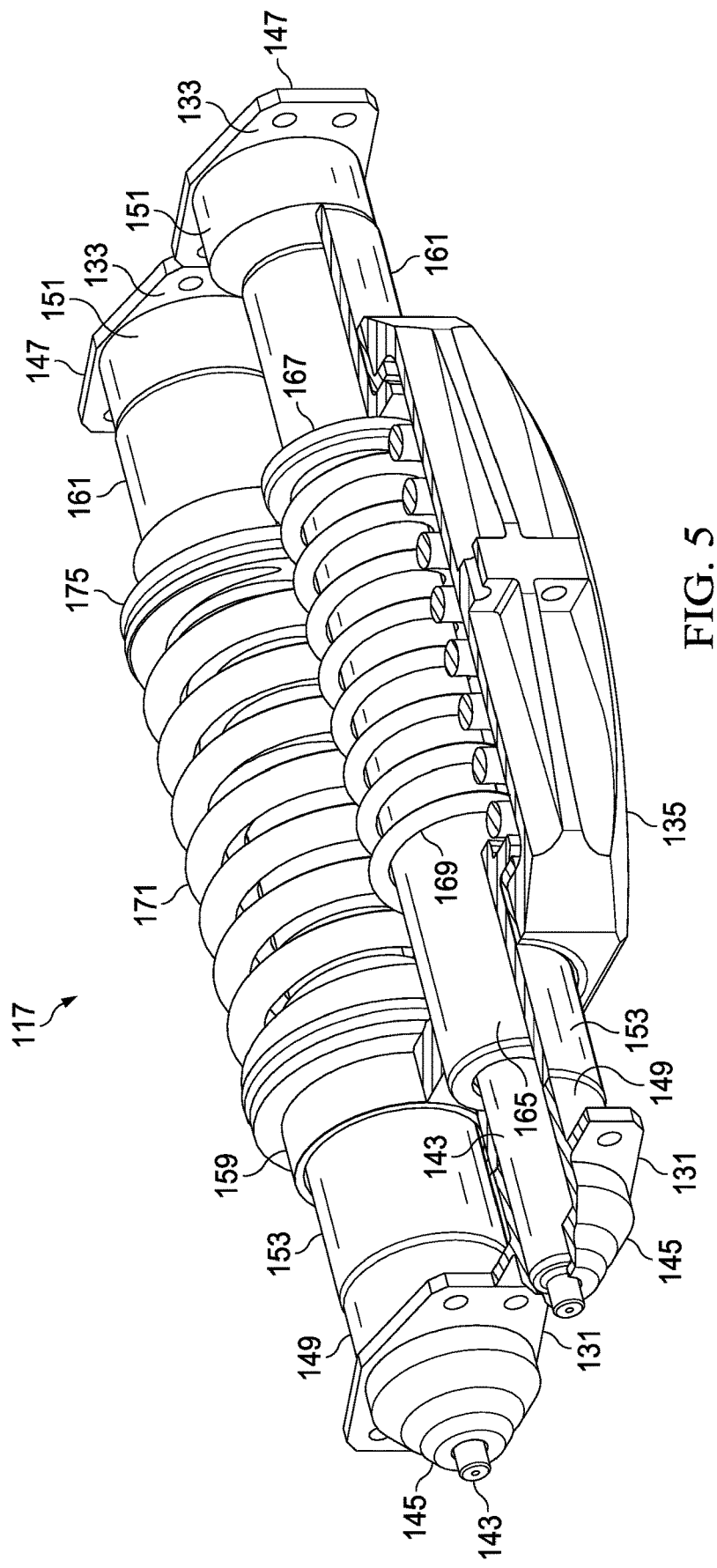
FIG. 5 is a partially sectioned oblique view of the attenuator of FIG. 4.

Referring now to FIGS. 4 and 5, attenuator 117 comprises a first mass 135 that also operates as a frame for components of attenuator 117. Motion of first mass 135 may be completely passive, though an optional motor 137 can be coupled to cover 129 (FIG. 3) and operate a crank assembly 139 for active positioning of first mass 135 relative to mast axis 107. Two spring-mass assemblies 141 are carried in a parallel orientation within first mass 135.

Assemblies 141 are preferably identical and comprise a central shaft 143 on which additional components of each assembly 141 are assembled, shafts 143 defining an axis of motion for the components of attenuator 117. The ends of shafts 143 are installed in mounting plates 145, 147, which have mounting flanges 131, 133, respectively. As mentioned above, assembly 141 is coupled to either baseplate 127 or cover 129 for locating assemblies 141 relative to mast axis 107. Each plate 145 has a cylindrical stop 149, and each plate 147 has a solid stop 151. A cylindrical forward collar 153 has an outer spring perch 155 and an inner spring perch 157, and collar 153 is slidably carried in bushing 159 mounted in first mass 135. A cylindrical rear collar 161 has a spring perch 163. A second mass 165 is slidably carried on shaft 143, and the inner diameters of collars 153, 161 are sized to slidably receive second mass 165. Second mass 165 has a spring perch 167. A spring 169 extends between spring perch 157 of forward collar 153 and spring perch on 167 of second mass 165 for biasing forward collar 153 away from spring perch 167 of second mass 165. A spring 171 extends between spring perch 155 of forward collar 153 and spring perch 163 of rear collar 161 for biasing collars 153, 161 away from each other. Springs 169 and 171 have spring rates selected for the application, and the spring rates may be equal or unequal. Rear collar 161 is slidably carried in bushing 175 mounted in first mass 135.

Figure 6:
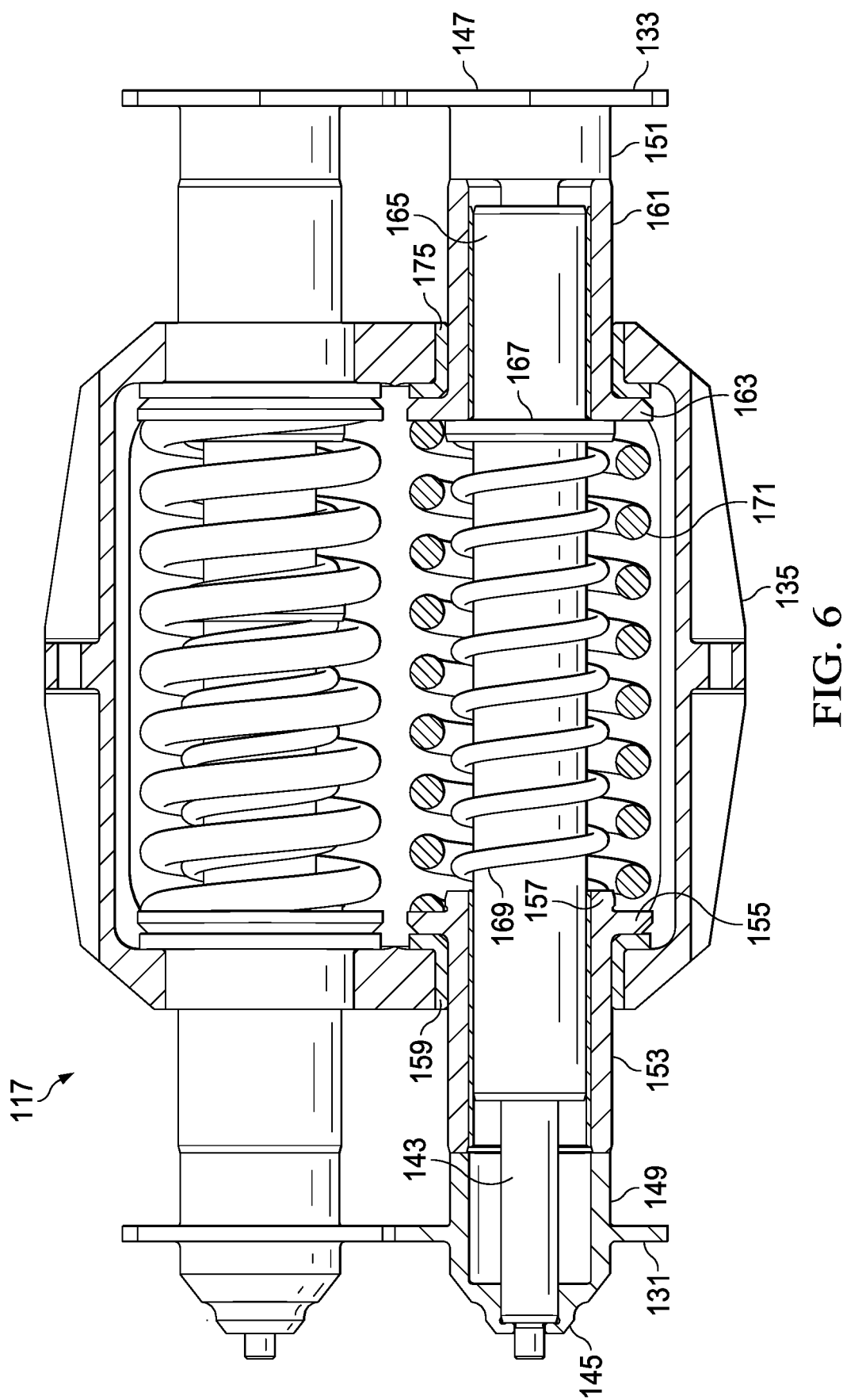
FIG. 6 is a partially sectioned top view of the attenuator of FIG. 4, the components being shown in a rest position.
Figure 7:
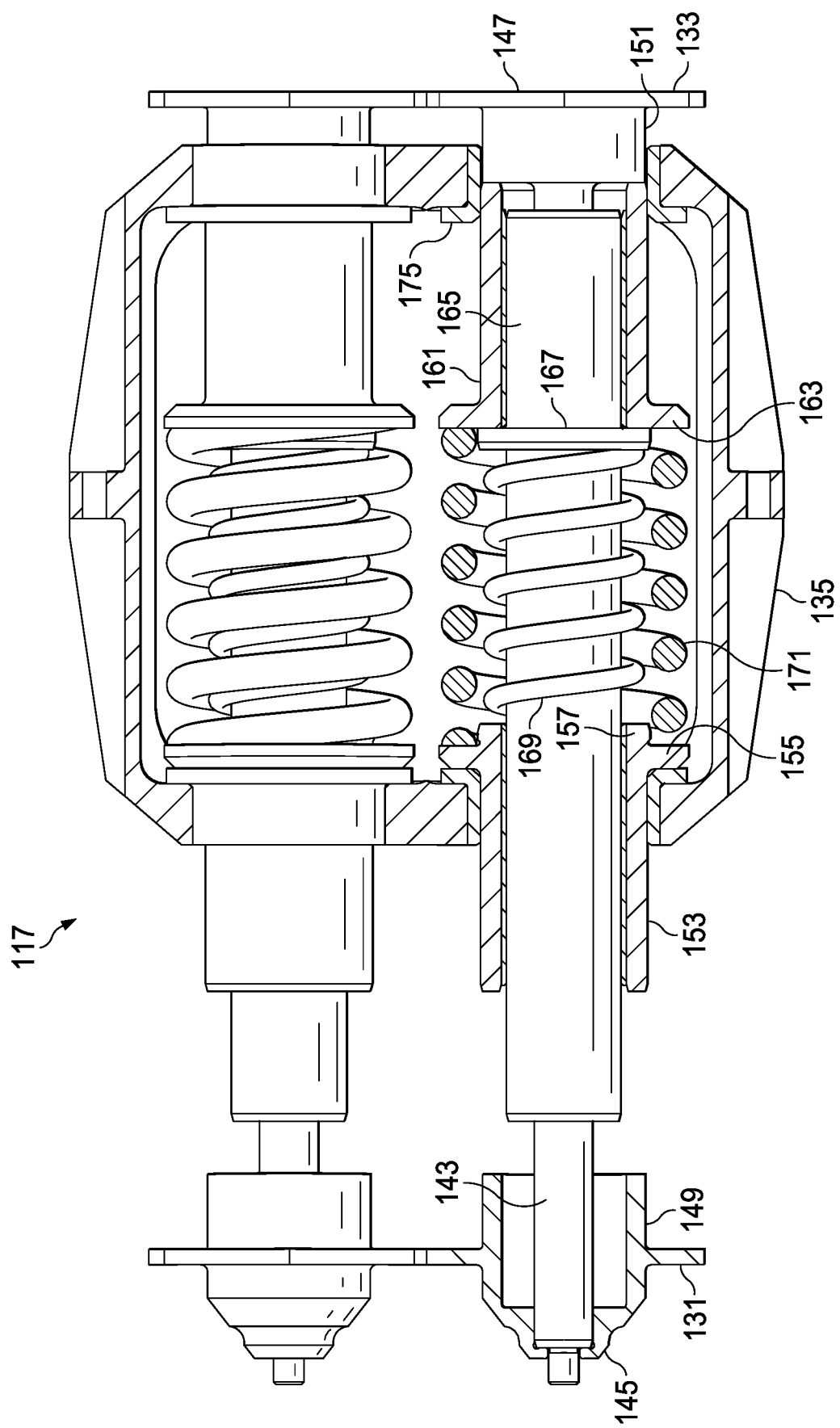
FIG. 7 is a partially sectioned top view of the attenuator of FIG. 4, the components being shown in a first attenuation position.
Figure 8:
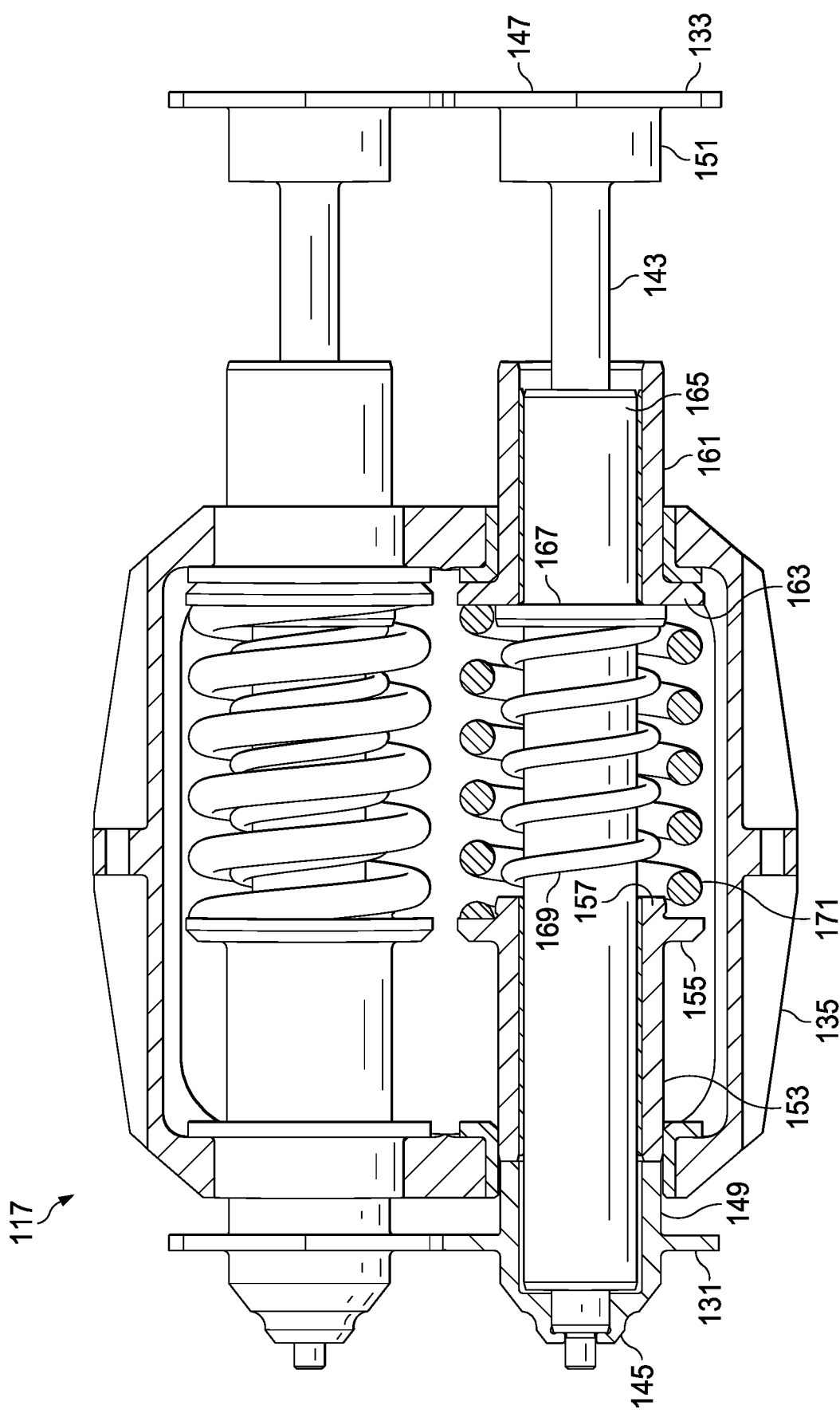
FIG. 8 is a partially sectioned top view of the attenuator of FIG. 4, the components being shown in a second attenuation position.

FIG. 6 shows attenuator 117 with masses 135, 165 at their rest positions, FIG. 7 shows first mass 135 in a first attenuation position and second mass 165 in a rest position, and FIG. 8 shows second mass 165 in an attenuation position and first mass 135 in a second attenuation position. The figures show masses 135, 165 in attenuation positions at the maximum of allowable translation, but it should be noted that masses 135, 165 may translate to any position between the rest position and the maximum during operation. At rest, forward collar 153 is adjacent stop 149, a rear end of rear collar 161 is adjacent stop 151, spring perch 167 of second mass 165 is adjacent spring perch 163 of rear collar 161, and first mass 135 is biased to a central rest position.

In FIG. 7, first mass 135 is shown moved rearward to a first attenuation position. Spring perch 155 of forward collar 153 is larger than the aperture in first mass 135 in which collar 153 is carried, causing collar 153 to move rearward with first mass 135. As first mass 135 moves rearward, rear collar 161 is prevented from moving rearward by stop 151, and the rearward motion of forward collar 153 relative to rear collar 161 and second mass 165 compresses springs 169 and 171.

In FIG. 8, first mass 135 and second mass 165 are shown moved forward to a second attenuation position. Spring perch 163 of rear collar 161 is larger than the aperture in first mass 135 in which collar 161 is carried, causing collar 161 to move forward with first mass 135. As first mass 135 moves forward from the rest position, forward collar 153 is prevented from moving forward by stop 149. Spring perch 167 of second mass 165 is larger than the inner diameter of rear collar 161, and the forward motion of rear collar 161 together with first mass 135 causes second mass 165 to slide forward on shaft 143, the forward end of second mass 165 moving into the interior of stop 149. The forward motion of rear collar 161 and second mass 165 relative to forward collar 153 compresses springs 169 and 171.

Figure 9:
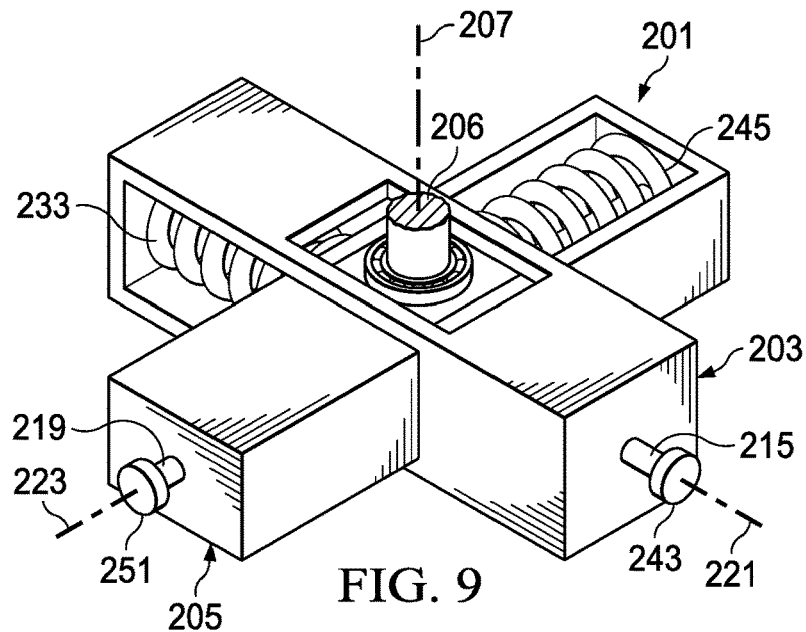
FIG. 9 is an oblique view of another embodiment of a vibration attenuator according to this disclosure.
Figure 10:
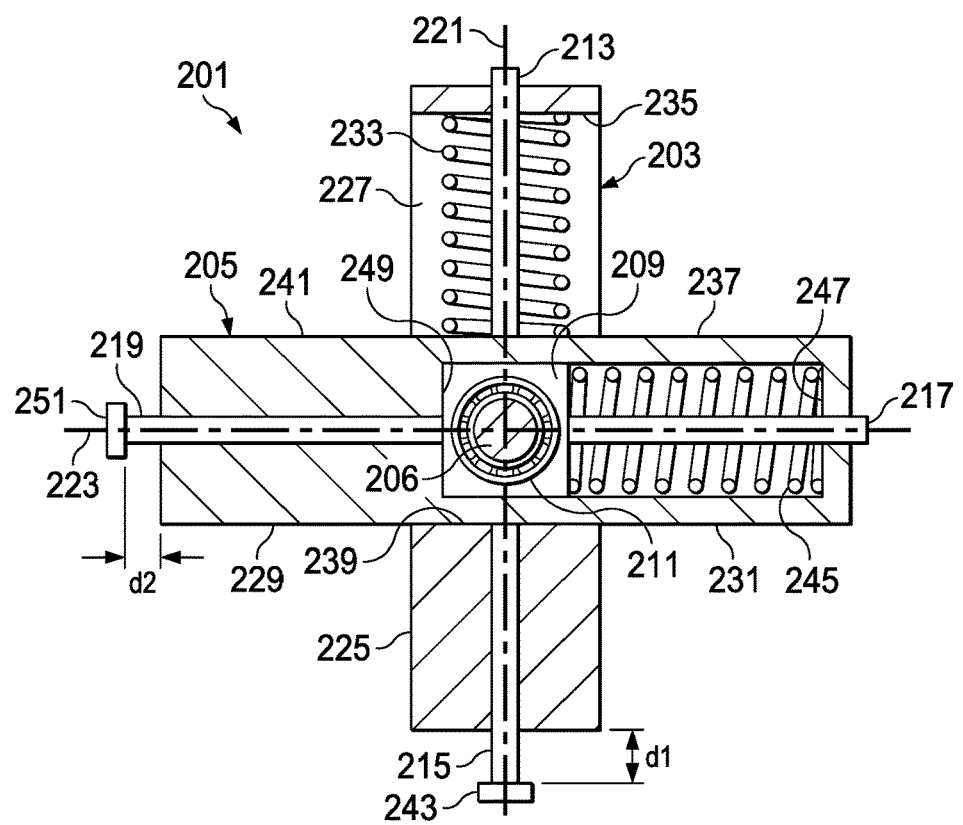
FIG. 10 is a cross-section top view of the attenuator of FIG. 9, the components being shown in a rest position.
Figure 11:
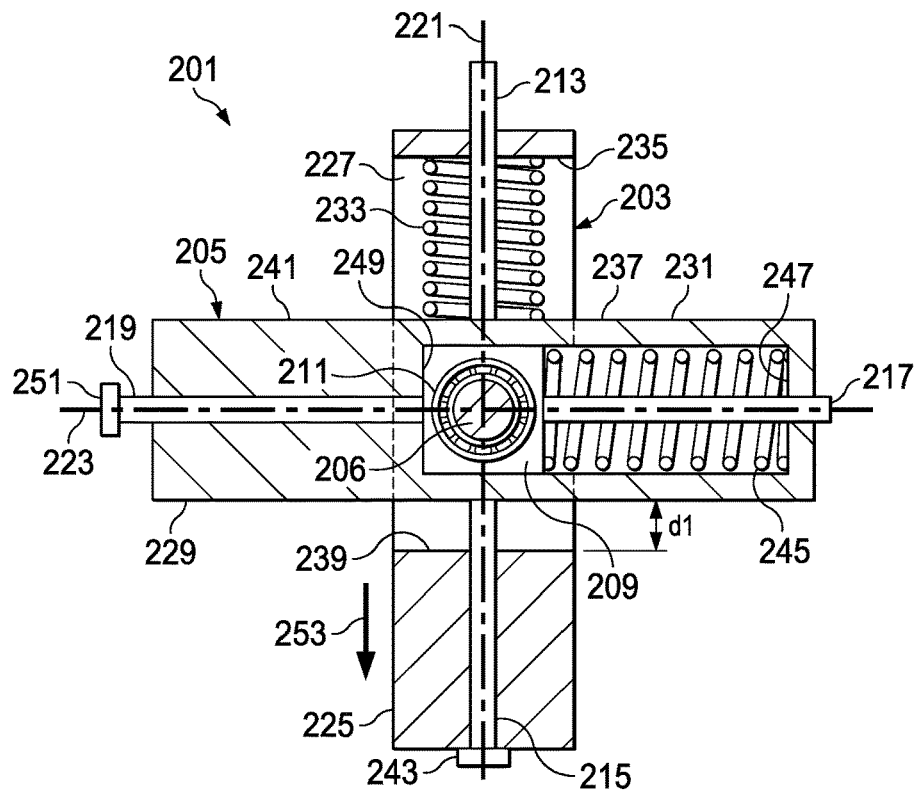
FIG. 11 is a cross-section top view of the attenuator of FIG. 9, the components being shown in a first attenuation position.
Figure 12:
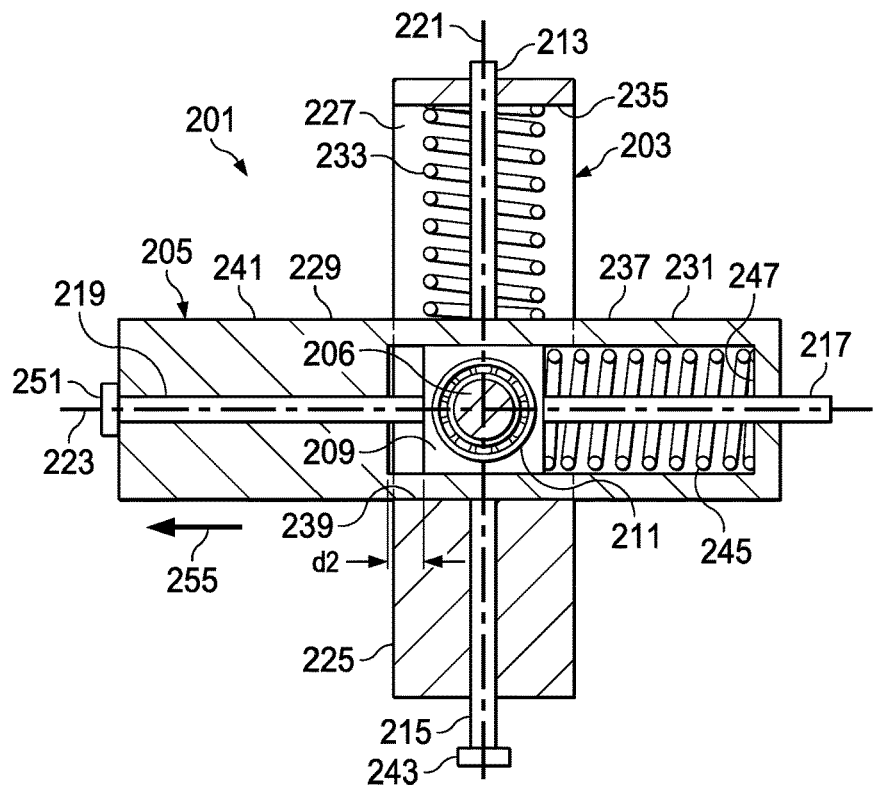
FIG. 12 is a cross-section top view of the attenuator of FIG. 9, the components being shown in a second attenuation position.

FIG. 9 is an oblique view, and FIGS. 10 through 12 are cross-section top views, of another embodiment of a hub- or mast-mounted vibration attenuator 201 according to this disclosure. Attenuator 201 has a first mass assembly 203 and a second mass assembly 205, each biased toward a rest position in which its center of mass is preferably symmetric about mast 206 for rotation about mast axis 207. Mass assemblies 203, 205 are translatably coupled to a central member, such as block 209, and bearings 211 allow attenuator 201 to rotate relative to mast 206 or the hub to which attenuator 201 is mounted. In the embodiment shown, block 209 is square and has one of shafts 213, 215, 217, 219 fixedly coupled to each side of block 209, block 209 and shafts 213, 215, 217, 219 forming a frame. Shafts 213, 215 are coaxial about a first axis 221 and allow for first mass assembly 203 to translate along first axis 221 relative to shafts 213, 215, whereas shafts 217, 219 are coaxial about a second axis 223 oriented 90 degrees from axis 221 and allow for second mass assembly 205 to translate along second axis 223 relative to shafts 217, 219. First mass assembly 203 comprises a solid section 225 carried on shaft 215 and an open section 227 carried on shaft 213, sections 225, 227 being coupled to each other for movement together along axis 221. Likewise, second mass assembly 205 comprises a solid section 229 carried on shaft 219 and an open section 231 carried on shaft 217, sections 229, 231 being coupled to each other for movement together along axis 223.

A spring 233 is located within open section 227 of mass assembly 203, spring 233 being coaxial with axis 221 and extending between inner surface 235 of open section 227 and outer surface 237 of mass assembly 205. Spring 233 biases mass assembly 203 toward the rest position shown in FIGS. 9, 10, and 12, in which an inner surface 239 of solid section 225 is in contact with an outer surface 241 of mass assembly 205. Contact between surfaces 239 and 241 limits the translation of mass assembly 203 in one direction along axis 221, and a stop 243 on the free end of shaft 215 limits the translation of assembly 203 in the opposite direction to an amount indicated by dimension d1 in the figures.

A spring 245 is located within open section 231 of mass assembly 205, spring 245 being coaxial with axis 223 and extending between inner surface 247 of open section 231 and the associated outer surface of block 209. Spring 245 biases mass assembly 205 toward the rest position shown in FIGS. 9, 10, and 11, in which an inner surface 249 of solid section 229 is in contact with an associated outer surface of block 209. Contact between surface 249 and block 209 limits the translation of mass assembly 205 in one direction along axis 223, and a stop 251 on the free end of shaft 219 limits the translation of assembly 205 in the opposite direction to an amount indicated by dimension d2 in the figures. Shafts 213, 215 extend through apertures (not shown), such as slots, in the sides of assembly 205 for allowing translation of assembly 205 relative to shafts 213, 215.

In attenuator 201, mass assemblies 203, 205 are configured for independent movement relative to each other and to block 209. Assembly 203 is shown having less mass than assembly 205, though assemblies 203, 205 may be configured to have the same or similar mass. Springs 233, 245 may be configured to have the same or different selected spring rates.

In operation, attenuator 201 may be allowed to spin freely or be actively spun by a motor or other component at a selected RPM relative to the mast/hub RPM. In FIG. 11, assembly 203 is shown translated in the direction indicated by arrow 253 by distance d1, which is the maximum amount of translation allowed by stop 243. In FIG. 12, assembly 205 is shown translated in the direction indicated by arrow 255 by distance d2, which is the maximum amount of translation allowed by stop 251. The amount of translation during operation may be less than the maximum, and which assembly 203, 205 responds to a particular vibration and by how much it translates is determined by the selected mass, spring rate, and rotation speed of attenuator 201.

Figure 13:
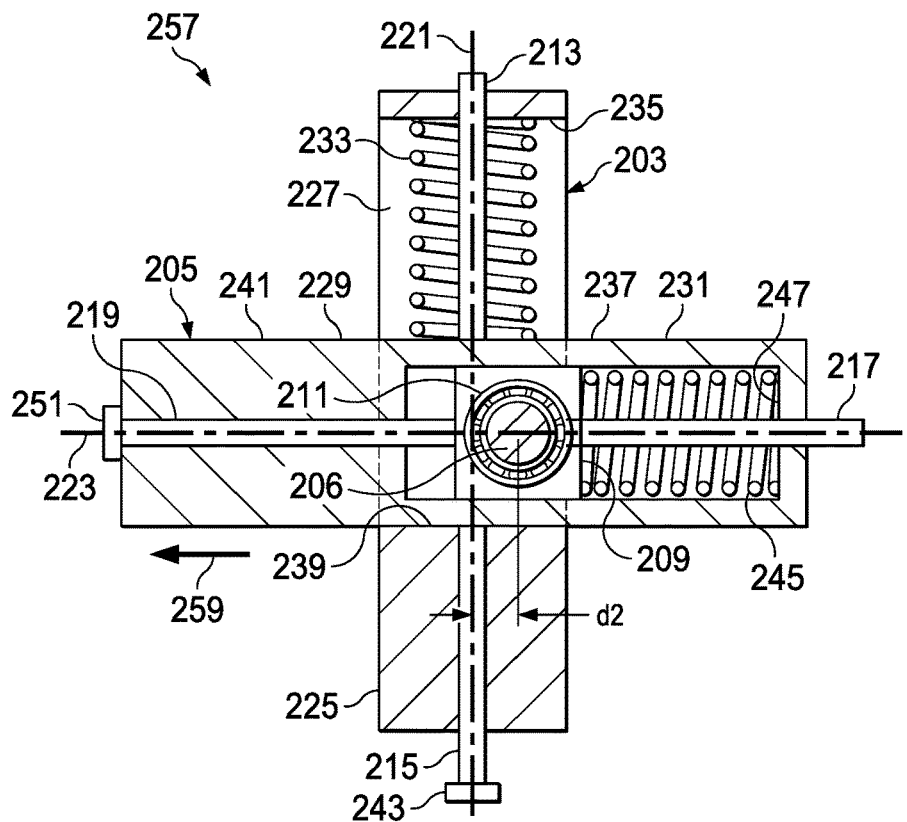
FIG. 13 is a cross-section top view of another embodiment of the attenuator of FIG. 9, the components being shown in the second attenuation position.

FIG. 13 is a cross-section top view of another embodiment of an attenuator according to this disclosure. Attenuator 257 is shown constructed with identical components and in a configuration similar to attenuator 201, but shafts 213, 215 are coupled to outer surfaces 237, 241, respectively, of mass assembly 205. Though assembly 203 is still free to translate along first axis 221 independently from assembly 205, shafts 213, 215 and mass assembly 203 translate together with assembly 205 parallel to second axis 223. As shown in FIG. 13, assemblies 203, 205 are shown translated distance d2 in the direction indicated by arrow 259. In the configuration of attenuator 257, the effective mass of mass assembly 205 is the combined mass of assemblies 203, 205.

Figure 14:
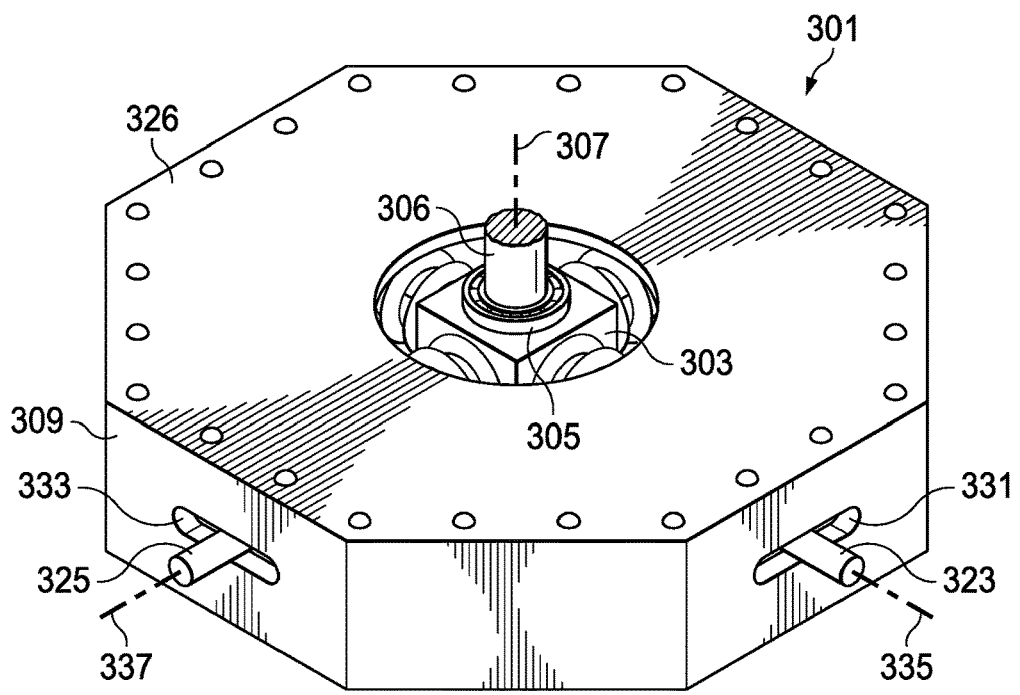
FIG. 14 is an oblique view of another embodiment of a vibration attenuator according to this disclosure.
Figure 15:
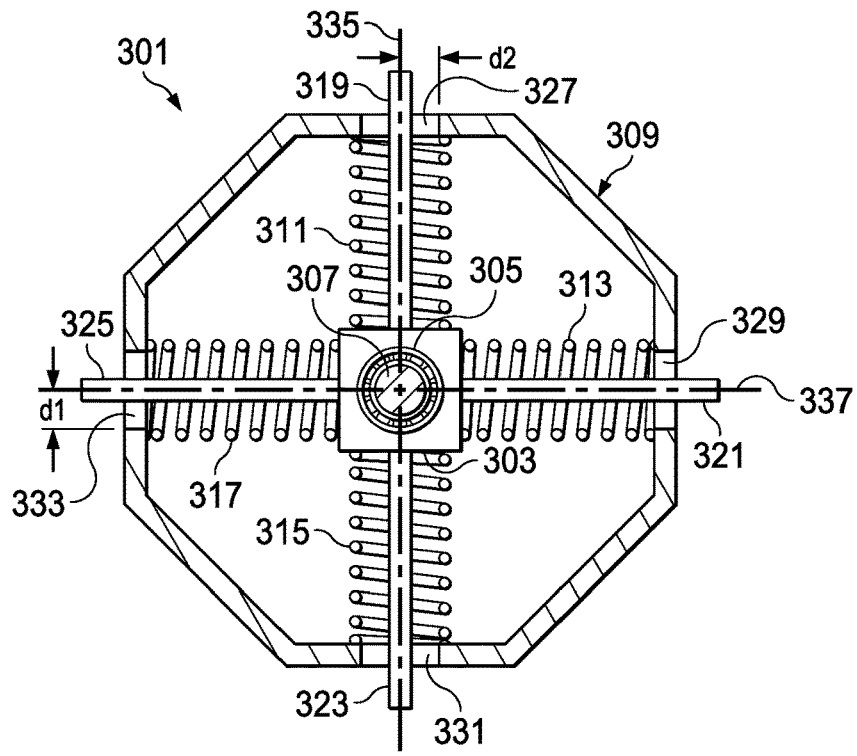
FIG. 15 is a cross-section top view of the attenuator of FIG. 14, the components being shown in a rest position.

FIG. 14 is an oblique view, and FIGS. 15 through 18 are cross-section top views, of another embodiment of a hub- or mast-mounted attenuator according to this disclosure. Attenuator 301 comprises a central member, such as square central block 303, and bearings 305 allow block 303 to rotate relative to mast 306 about mast axis 307. As described above for other embodiments, attenuator 301 may spin passively or may be actively spun by a motor at a selected RPM relative to the hub/mast. A preferably symmetrical mass ring 309 is shown coaxial with mast axis 307 while at rest and coupled to block 303 with springs 311, 313, 315, 317, and each spring is coaxial with one of shafts 319, 321, 323, 325, respectively, when ring 309 is in the rest position shown in FIGS. 14 and 15. Block 303 and shafts 319, 321, 323, 325 form a frame. A removable cover 326 is shown installed on ring 309 in FIG. 14. Springs 311, 313, 315, 317 preferably have different spring rates selected for the particular application, though spring rates of two or more springs 311, 313, 315, 317 may be identical in some embodiments.

Each shaft 319, 321, 323, 325 extends from one side of block 303 and protrudes through an associated aperture 327, 329, 331, 333, respectively, of ring 309. Shafts 319, 323 are coaxial about a first axis 335, and shafts 321, 325 are coaxial about a second axis 337 oriented 90 degrees from first axis 335. This configuration allows ring 309 to translate relative to block 303 a limited distance in directions parallel to both axes 335, 337. The limit of translation of ring 309 is defined by the width of apertures 327, 329, 331, 333, in that the inner surfaces of apertures 327, 329, 331, 333 contact the associated shaft 319, 321, 323, 325 after ring 309 has translated a distance d1 parallel to axis 337 or d2 parallel to axis 335 from the rest position shown in FIGS. 14 and 15.

Figure 16:
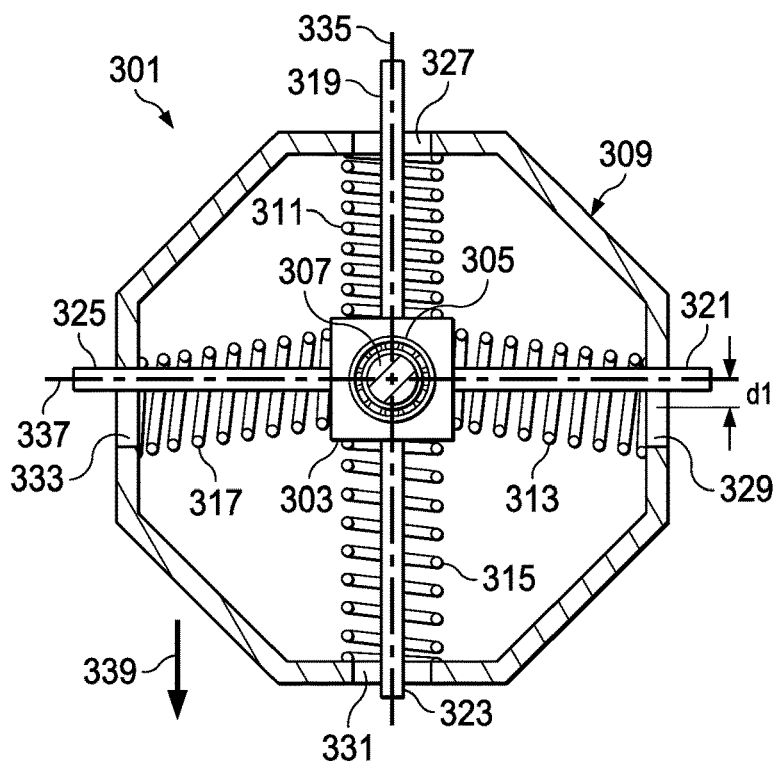
FIG. 16 is a cross-section top view of the attenuator of FIG. 13, the components being shown in a first attenuation position.
Figure 17:
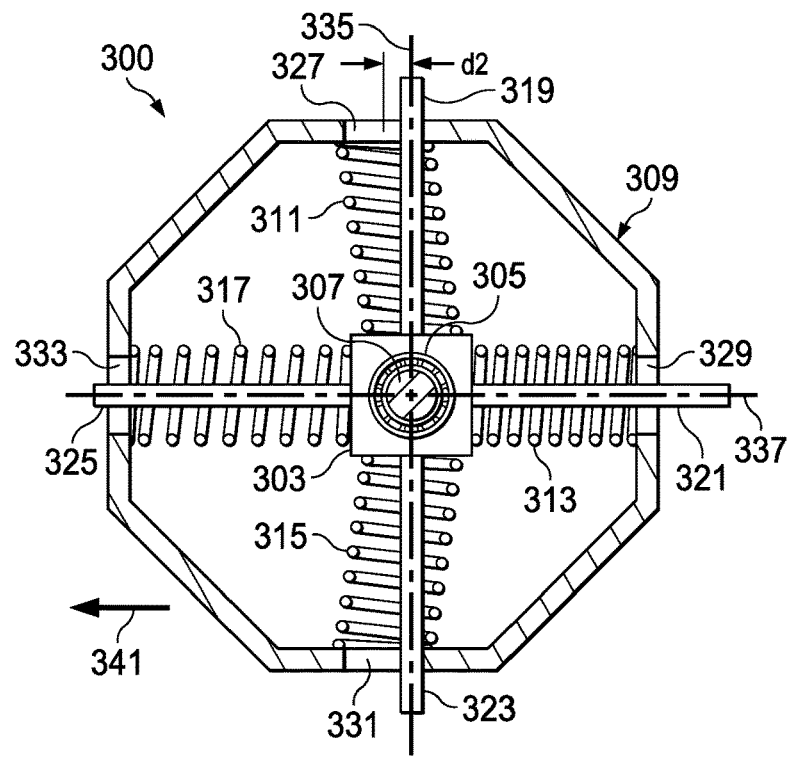
FIG. 17 is a cross-section top view of the attenuator of FIG. 13, the components being shown in a second attenuation position.
Figure 18:
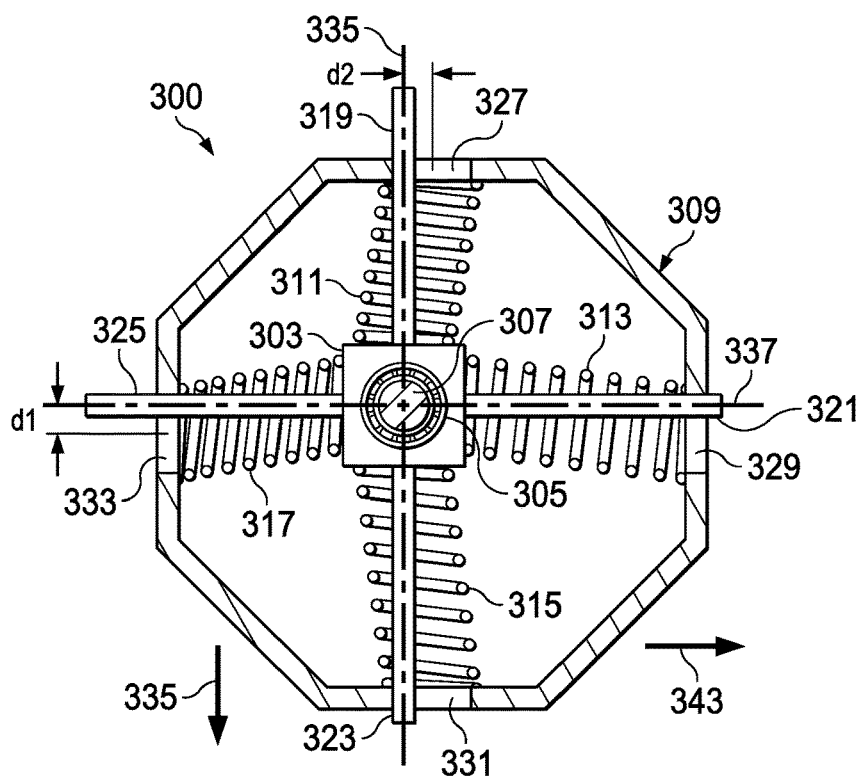
FIG. 18 is a cross-section top view of the attenuator of FIG. 13, the components being shown in a third attenuation position.

As shown in FIGS. 16 through 18, mass ring 309 may move in directions parallel to one or both axes 335, 337. In FIG. 16, ring 309 is shown translated distance d1 relative to block 303 in a direction parallel to axis 335 and indicated by arrow 339, compressing spring 311, and elongating springs 313, 315, 317, but ring 309 remains symmetric about axis 335. Likewise, in FIG. 17, ring 309 is shown translated distance d2 relative to block 303 in a direction parallel to axis 337 and indicated by arrow 341, compressing spring 313, and elongating springs 311, 315, 317, but ring 309 remains symmetric about axis 337. FIG. 18 shows ring 309 translated in directions parallel to both axes 335, 337 and indicated by arrows 339, 343, compressing springs 311, 317.

Though embodiments with passive components are shown above, the attenuators may include active components for positioning mass assemblies in selected locations, limiting translation of mass assemblies, and/or changing spring rates of biasing devices. In addition, thought shown with coil springs, embodiments according to this disclosure may use other types of biasing devices, such as, for example, elastomerics, torsion or other elastic springs, and pneumatics.

In addition to the embodiments shown, it should be noted that other embodiments include back-to-back masses and/or springs configured to translate coaxially. Also, some embodiments may include turrets, tracks, or other components that define paths of motion for masses. Springs of some embodiments may be oriented in off-axis directions, such as, for example, parallel to the mast axis, and these configurations may include a lever, bell crank, rack and pinion, or other coupling for translating motion and forces between components. It should also be noted that energy harvesting may be employed to generate electrical energy from the motion of masses in an attenuator of this disclosure.

In operation of some embodiments of attenuators, it may necessary to control the speed and/or phasing of the attenuator relative to the hub/mast to switch between which mass is being used for attenuation or which direction a mass is translated from the rest position. For example, the attenuator could be spun to a phasing in which the axis for the active mass is at 90 degrees from the forcing function, allowing the excited mass to return to the rest position, and then spin the attenuator at 180 degrees to switch to the other mass or other direction.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A vibration attenuator for a rotor rotatable about a mast axis, the attenuator comprising:
    a shaft having an axis perpendicular to the mast axis and configured for rotation about the mast axis relative to the rotor;
    a first mass carried by the shaft, the first mass being axially translatable along the associated shaft from a first-mass rest position in a first direction and in an opposing second direction, a first biasing force urging the first mass toward the first-mass rest position for opposing motion of the first mass in the first direction and a second biasing force urging the first mass toward the first-mass rest position for opposing motion in the second direction; and
    a second mass axially carried by the shaft, the second mass being translatable along the shaft only in the second direction together with the first mass from a second-mass rest position, the second biasing force also urging the second mass toward the second-mass rest position for opposing motion of the second mass in the second direction;
    wherein the masses are configured for moving radially outward from the rest position to oppose vibrations caused by operation of the rotor.

2. The vibration attenuator of claim 1, wherein the first and second masses are of unequal mass.

3. The vibration attenuator of claim 1, wherein the first and second biasing forces are of unequal force.

4. The vibration attenuator of claim 1, further comprising:
    a motor coupled to the first mass for causing selective translation of the first mass relative to the shaft.

5. The vibration attenuator of claim 1, further comprising:
    a motor configured for causing rotation of the shaft relative to the rotor about the mast axis at a selected frequency.

6. The vibration attenuator of claim 1, further comprising:
    a second shaft parallel to the first and second directions; wherein the masses are also carried by the second shaft and axially translatable relative to the second shaft.

7. A vibration attenuator for a rotor rotatable about a mast axis, the attenuator comprising:
    a frame having a central member and first and second pairs of shafts, the shafts of each pair extending radially from opposing sides of the member, each pair defining a translation axis;
    a first mass translatably carried on the first pair of shafts, a first biasing force urging the first mass toward a first-mass rest position in which the first mass is symmetric about the mast axis; and
    a second mass translatably carried on the second pair of shafts, a second biasing force urging the second mass toward a second-mass rest position in which the second mass is symmetric about the mast axis;
    wherein a selected first or second mass moves radially outward from the rest position to oppose vibrations caused by operation of the rotor.

8. The vibration attenuator of claim 7, wherein the first and second masses are of unequal mass.

9. The vibration attenuator of claim 7, wherein the first and second biasing forces are of unequal force.

10. The vibration attenuator of claim 7, wherein the translation axes are orthogonal.

11. The vibration attenuator of claim 7, wherein the frame and masses rotate passively about the mast axis.

12. The vibration attenuator of claim 7, further comprising:
    a motor coupled to the frame for causing rotation of the frame relative to the rotor at a selected frequency.

13. A vibration attenuator for a rotor rotatable about a mast axis, the attenuator comprising:
    a frame having a central member and first and second pairs of shafts, the shafts of each pair extending radially from opposing sides of the member, each pair defining a translation axis, the frame being rotatable relative to the rotor about the mast axis;
    a mass ring coupled to the central member by four springs, each spring being coaxial with an associated one of the shafts when the ring is in the rest position and urging the ring toward a rest position with a mass of the ring;
    wherein the ring moves radially outward from the rest position to oppose vibrations caused by operation of the rotor.

14. The vibration attenuator of claim 13, further comprising:
    a slot for each shaft formed in a periphery of the ring;
    wherein each shaft protrudes through an associated slot, a width of each slot defining the distance limits of translation for the ring relative to the shafts.

15. The vibration attenuator of claim 13, wherein the spring rates of at least some of the springs are unequal.

16. The vibration attenuator of claim 13, further comprising:
    a motor for causing rotation of the frame relative to the rotor at a selected frequency.

* * * * *